United States Patent [19]
Kearns

[11] 3,774,091
[45] Nov. 20, 1973

[54] INTERMITTENT WINDSHIELD WIPER SYSTEM WITH ELECTRODYNAMIC BRAKING

[76] Inventor: Robert W. Kearns, 20524 Rutherford Ave., Detroit, Mich. 48235

[22] Filed: Dec. 22, 1970

[21] Appl. No.: 100,826

Related U.S. Application Data
[62] Division of Ser. No. 731,531, May 23, 1968, Pat. No. 3,582,747.

[52] U.S. Cl. .............. 318/DIG. 2, 318/380, 318/443
[51] Int. Cl. .............................................. H02p 7/28
[58] Field of Search............... 318/443, 380, DIG. 2, 318/369

[56] References Cited
UNITED STATES PATENTS

| | | | |
|---|---|---|---|
| 3,497,790 | 2/1970 | Tixier | 318/369 X |
| 3,378,740 | 4/1968 | Cruel | 318/380 X |
| 3,262,041 | 7/1966 | Wickenhagen | 318/369 |
| 3,351,836 | 11/1967 | Kearns | 318/443 |
| 3,411,064 | 11/1968 | Mellor | 318/339 |
| 3,447,054 | 5/1969 | Hansen et al. | 318/443 |
| 3,219,901 | 11/1965 | Foreman et al. | 318/443 |

Primary Examiner—Benjamin Dobeck
Attorney—Lane, Aitken, Dunner & Ziems

[57] ABSTRACT

This specification discloses an intermittent automotive windshield wiper system in which windshield wipers are driven in repeating wiping cycles, stopping for a dwell period at the end of each wiping cycle. The windshield wipers are driven by an electric motor having a permanent magnet field and the wipers are electrodynamically braked to a stop at the end of each wiping cycle. An automatic switch is provided to, in effect, assure that the braking circuit is open at the end of each dwell period when the motor armature is again energized so that DC power is not applied to the braking circuit in parallel with the motor armature at the end of each dwell period.

13 Claims, 6 Drawing Figures

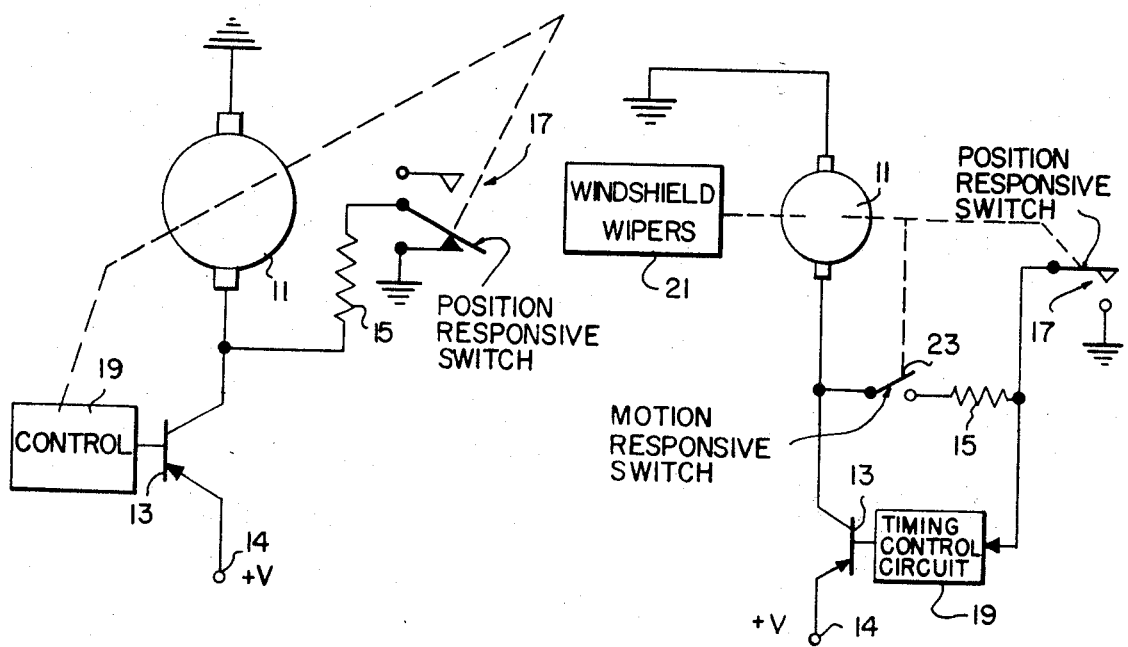

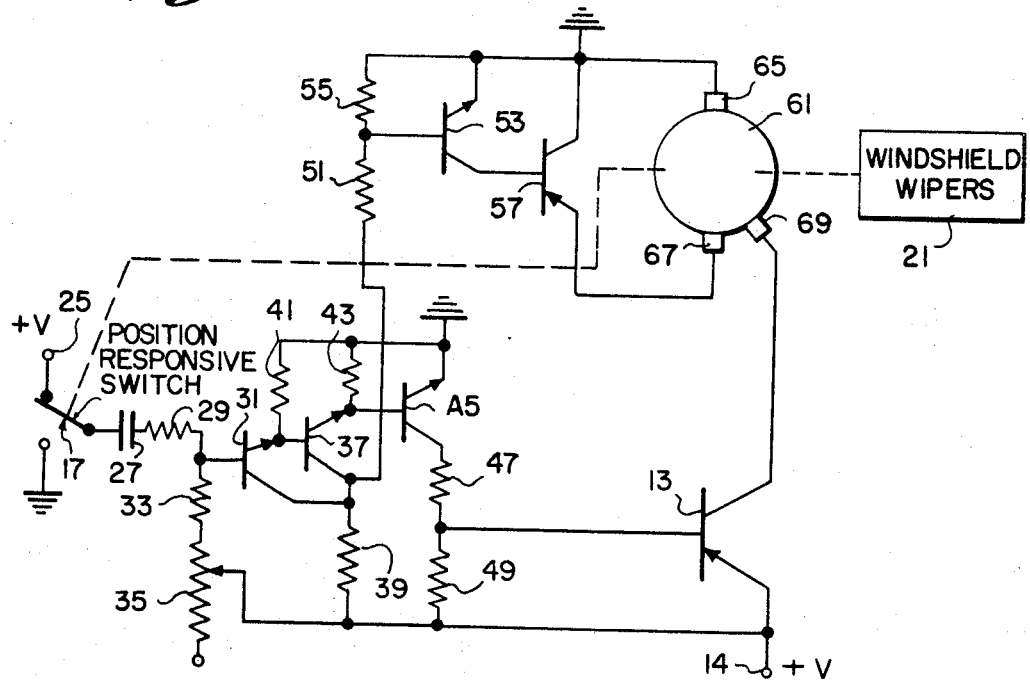
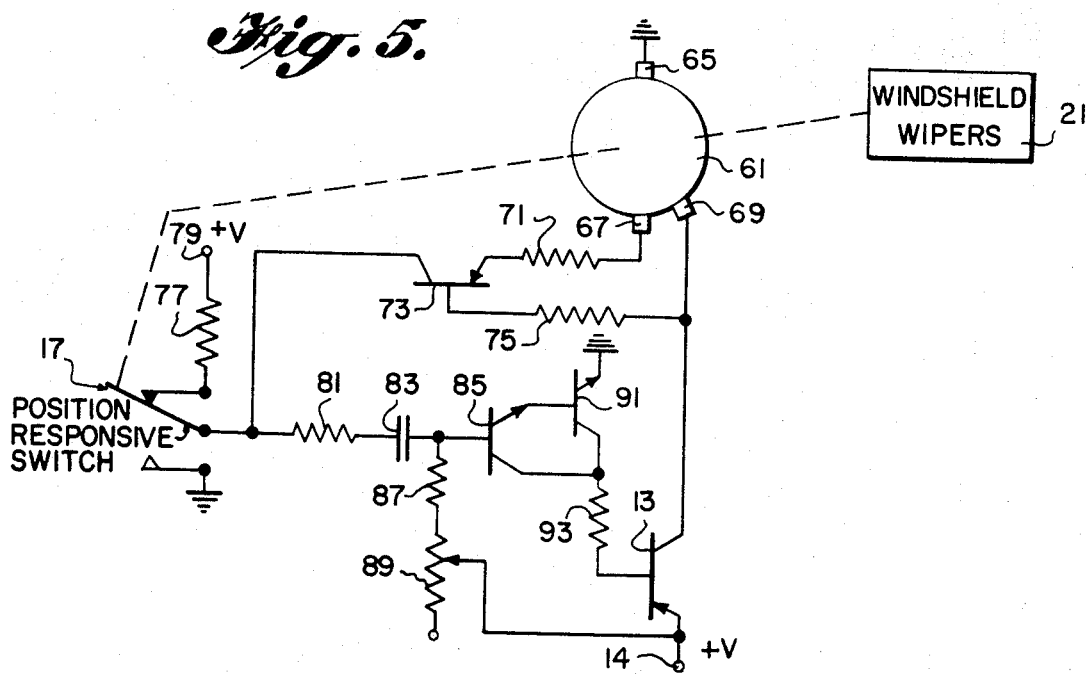

INTERMITTENT WINDSHIELD WIPER SYSTEM WITH ELECTRODYNAMIC BRAKING

CROSS-REFERENCE TO RELATED APPLICATION

This application is a division of copending application Ser. No. 731,531, filed May 23, 1968, now U.S. Pat. No. 3,582,747.

BACKGROUND OF THE INVENTION

This invention relates to intermittent automotive windshield wiper systems, and more particularly, to an intermittent windshield wiper system with improved electrodynamic braking.

Under certain conditions, such as light rain or splash back produced by other vehicles on wet roads, the condition of the windshield is often in a condition in which windshield wiper operation will cause smearing, obscuring the vision of the driver. The wiper element may also be inadequately lubricated resulting in undue wear. To overcome these problems, there have been developed intermittent windshield wiper systems in which the wiper blade dwells for a time interval at the end of each wiping cycle.

Ideally, to reduce the interference with the driver's vision and attention to a minimum, the intermittently operated windshield wiper should simulate an eye blink, wiping over the windshield at a very high speed and stopping for a dwell period at the end of each wiping cycle near the bottom of the windshield molding. In order to get the windshield wiper blade to stop each time in a precise position near the windshield molding, the wiper system must be braked to a stop in a small region, which for convenience shall be referred to as the $\theta$ region. Since preferably the wiper blade is driven at a high speed and since it must be brought to stop in a small region, considerable braking force must be applied to the system in order to bring the system to a stop in the $\theta$ region.

FIG. 1 illustrates a system which could be used to intermittently drive the wiper blades through repeating wiping cycles with a dwell period at the end of each wiping cycle and to brake the motor to a stop at the end of each wiping cycle in a small $\theta$ region. As shown in FIG. 1, the motor which drives the windshield wiper blades is designated by the reference number 11 and is a DC motor having a permanent magnet field. One side of the armature of the motor 11 is connected to ground and the other side of the armature of the motor 11 is connected to the collector of a PNP transistor 13, the emitter of which is connected to the positive side of the DC power supply of the automotive vehicle applied at a terminal 14. The collector of the transistor 13 is also connected through a resistor 15 to the pole of a position responsive switch 17, which is operated by the motor 11 and which connects to ground whenever the windshield wiper system is in the $\theta$ region. The system of FIG. 1 is also provided with a control 19 which renders the transistor 13 normally conductive but turns it off for a predetermined dwell period each time the windshield wiper system comes into the $\theta$ region. The control, for example, could be made responsive to the grounding of the pole of the switch 17. In operation, the control 19 turns the transistor 13 on to energize the motor 11 to drive the wiper blades through a wiping cycle at high speed. At the end of a wiping cycle when the system comes into the $\theta$ region, the pole of the switch 17 connects to ground thus connecting the resistor 15 across the armature of the motor 11. At the same time, the control 19 turns the transistor off. As a result, the motor 11 will be electrodynamically braked to a stop and thus can be stopped in the very small $\theta$ region even though the wiper blades are being driven at a high speed. The control will then maintain the transistor 13 turned off for the desired dwell period, at the end of which the control will turn the transistor 13 on. Accordingly, the motor will again be energized. In addition, current will flow through the braking resistor 15 until the motor has driven the windshield wiper system out of the $\theta$ region, whereupon the pole of the switch 17 will disengage from ground. Thus, it will be seen with this system, a substantial amount of current will be sent through the braking resistor when the windshield blades are restarted. If the resistor 15 is made too small in order to provide sufficient braking to stop the wiper blade system in a small $\theta$ region to provide precise positioning of the wiper blades, then excessive current may be required from the power source possibly causing the transistor 13 to burn out and providing an excessive load on the power source itself. Moreover, occasionally an unusual load may be put on the wiper blades when the transistor 13 is turned on, such as a snow load or when the wiper blades are frozen to the windshield so that the motor 11 is not able to generate sufficient torque to immediately drive the wiper blades out of the $\theta$ region. In such a case, the current drawn by the braking resistor 15 is added to a high motor current and the combined currents would last for more than a short duration thus further aggravating the transistor burn out problem and the excessive power drain on the power supply.

SUMMARY OF THE INVENTION

The present invention overcomes these problems by providing an automatically operated switch in series with the braking circuit, which switch is automatically opened to prevent current from flowing from the source through the braking circuit when the power is applied to the motor at the end of the dwell period while the wiper system is still in the $\theta$ region. In some embodiments of the invention, this automatic switch is opened in response to the same signal from the control which causes the transistor switch between the motor and the power source to be rendered conductive at the end of the dwell period. In other embodiments, the switch is made responsive to the speed of the motor and only is closed when the motor is turning. Thus, when the power is applied to the motor at the end of the dwell period, the switch will be open and current from the power source will not be applied through the braking resistor in parallel with the motor.

Accordingly, an object of the present invention is to provide an improved intermittent windshield wiper system.

Another object of the present invention is to provide an intermittent windshield wiper system with improved electrodynamic braking.

A further object of the present invention is to eliminate the danger of excessive power drain and excessive current flow through the transistor switch of a transistorized intermittent windshield wiper system with electrodynamic braking.

A still further object of the present invention is to provide an intermittent windshield wiper system in which the wiper blade is made to stop precisely in the

BRIEF DESCRIPTION OF THE DRAWINGS

FIG. 1 illustrates a simplified schematic diagram of an intermittent windshield wiper system with electrodynamic braking;

FIG. 2 is a schematic circuit diagram of one embodiment of an intermittent windshield wiper system of the present invention; and FIGS. 3–6 are circuit diagrams of additional embodiments of intermittent windshield wiper systems of the present invention.

DETAILED DESCRIPTION OF THE PREFERRED EMBODIMENTS

Figure 6:
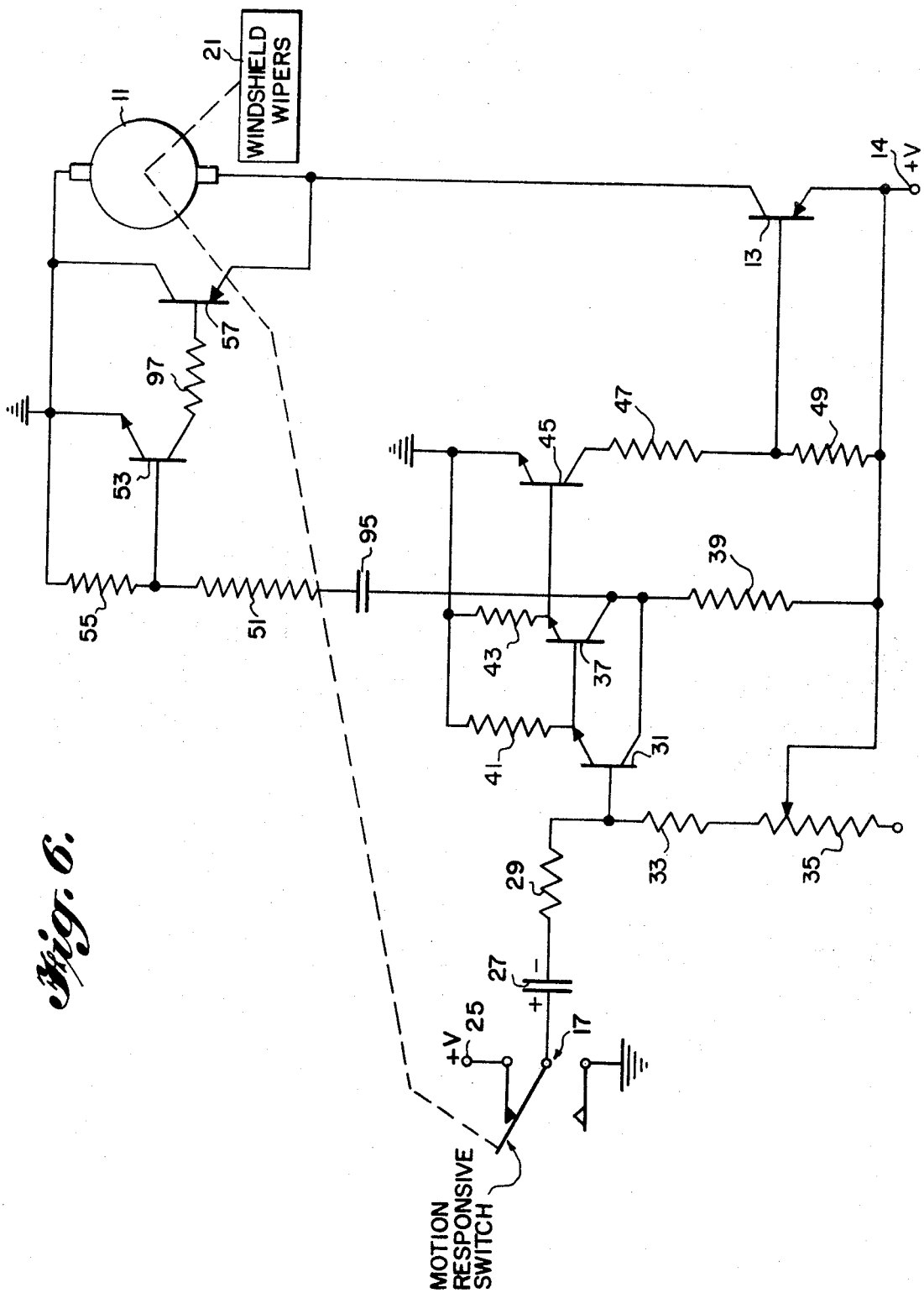

In the embodiment of the invention schematically illustrated in FIG. 2, a DC motor 11 having a permanent magnet field is connected to drive automotive vehicle windshield wipers 21 through repeating reciprocal wiping cycles across an automotive vehicle windshield in a conventional manner. One side of the armature of the motor 11 is connected to ground and the other side of the armature of the motor 11 is connected to the collector of a PNP transistor 13, the emitter of which is connected to the positive side of the automotive vehicle DC power supply applied at a terminal 14. A series circuit of a motion responsive switch 23 and a braking resistor 15 connects the collector of the transistor 13 to the pole of a position responsive switch 17. The motion responsive switch 23 responds to the motor 11 and will be closed whenever the motor 11 is rotating but will be open whenever the motor 11 is not rotating. The position responsive switch 17 operates in the same manner as it does in the system of FIG. 1 and will be closed and connect to ground whenever the windshield wiper system is in the $\theta$ region. At all other times, the switch 17 will be open. A timing control 19 is provided to control the conductivity of the transistor 13 and normally renders the transistor 13 conductive but will turn the transistor 13 off for a dwell period in response to ground potential being applied thereto from the switch 17. Thus the control 19 will turn the transistor 13 off for a dwell period when the windshield wiper system enters the $\theta$ region. Accordingly, when the motor is driving the windshield wipers through a wiping cycle, the switch 23 will be closed and the switch 17 will be open. The switch 17 will close and connect to ground when the system reaches the $\theta$ region, thus shunting the armature of the motor 11 with the resistor 15. At the same time, the timing control circuit 19 in response to the grounding of the switch 17 will turn the transistor off. As a result, the motor 11 will be braked to a stop because of being shunted by the braking resistor 15. As soon as the motor 11 stops, the motion responsive switch 23 will open. The timing control 19 will maintain the transistor 13 turned off for the desired dwell period whereupon it will turn the transistor back on. When the transistor turns back on, power will be applied from the terminal 14 through the motor 11 to start the motor on another wiping cycle. When power is first applied to the motor 11, the switch 23 will open so no power will be drained by the braking resistor. Before the switch 23 can close again, the motor 11 will drive the wiper system out of the $\theta$ region and the switch 17 will be open so the braking resistor 15 does not provide a drain on the power supply or cause excessive current to flow through the switching transistor 13. Accordingly, the resistor 15 can have a very low resistance or even be of zero resistance in order to bring the motor 11 to a very quick stop and thus enable the motor 11 to be precisely positioned adjacent the molding during the dwell period at the end of each wiping cycle.

FIG. 3 illustrates another embodiment of the present invention in which a transistor switch responding to the timing control is used instead of a motion responsive switch as is used in the system of FIG. 2. As shown in FIG. 3, the motor is again connected to drive the windshield wipers 21 in a conventional manner. One side of the armature of the motor 11 is connected to ground. The other side of the armature of the motor 11 is connected to the collector of the main switching transistor 13, the emitter of which is connected to the positive side of the DC power supply of the automotive vehicle applied at terminal 14. As in the cases of FIGS. 1 and 2, a position responsive switch 17 is provided, the pole of which connects to ground when the system is in the $\theta$ region. In the system of FIG. 3, the pole of the position responsive switch connects to the positive side of the automotive power supply applied at a terminal 25 at all times when the windshield wiper system is not in the $\theta$ region.

The pole of the switch 17 is connected to one side of a capacitor 27, the other side of which is connected through a resistor 29 to the base of an NPN transistor 31. The base of the transistor 31 is also connected through a resistor 33 to one side of a potentiometer 35, the movable arm of which is connected directly to the positive voltage applied at terminal 14. The emitter of the transistor 31 is connected to the base of an NPN transistor 37 and the collectors of the transistors 31 and 37 are connected together and through a resistor 39 to the positive DC voltage at terminal 14. The emitter of the transistor 31 is connected to ground through a resistor 41 and the emitter of the transistor 37 is connected to ground through a resistor 43. The emitter of the transistor 37 is also connected to the base of an NPN transistor 45, the emitter of which is grounded and the collector of which is connected through a resistor 47 to the base of the transistor 13. The base of the transistor 13 is also connected to the positive voltage at terminal 14 through a resistor 49. The collector of the transistor 37 is connected through a resistor 51 to the base of an NPN transistor 53, which base is also connected to ground through a resistor 55. The emitter of the transistor 53 is connected to ground and the collector of the transistor 53 is connected to the base of a PNP transistor 57, the collector of which is grounded. The emitter of the transistor 57 is connected through a resistor 59 to the junction between the motor 11 and the transistor 13.

When the motor 11 is driving the windshield wipers through a wiping cycle, the transistors 31, 37, 45 and 13 will be conducting and the armature of the motor 11 will be energized through the transistor 13. As a result of the transistor 37 conducting, the potential at the collector of the transistor 37 will be near ground and accordingly, the transistors 53 and 57 will be cut off. Accordingly, no current will flow through the resistor 59 which in the circuit of FIG. 3 is the braking resistor. As a result of the conduction of the transistors 31, 37 and 45, the potential at the base of the transistor 31 will be near ground. Since the windshield wiper system is not in the $\theta$ region, the pole of the switch 17 will be connected to the positive side of the power supply applied at terminal 25. As a result, the capacitor 27 will be charged with a voltage about equal to the voltage of the automotive vehicle power supply while the motor 11 is driving the windshield wipers through a wiping cycle. When the windshield wiper system reaches the $\theta$ region, the pole of the switch 17 will disconnect from the positive power supply and connect to ground. As a result, the other side of the capacitor 27 will be jumped to a negative potential about equal to the voltage of the power supply. This negative potential will reverse bias the base emitter junction of the transistor 31 cutting off the transistors 31, 37 and 45 which in turn will cut off the transistor 13, thus cutting off the power supply from the armature 11. In response to the transistor 37 being cut off, the potential at the base of the transistor 53 will rise causing it to conduct which in turn will cause the transistor 57 to saturate. Accordingly, at the same time, the transistor 13 is cut off when the windshield wiper system enters the $\theta$ region, the transistor 57 will be rendered conductive to provide a shunt path including the resistor 59 across the motor 11. Thus, when the windshield wiper system enters the $\theta$ region, the energization circuit of the motor is opened and a braking circuit is shunted across the motor to brake the motor to a stop. As soon as the pole of the switch 17 engages ground causing the transistor 31 to be cut off, current will begin to flow from the positive source of terminal 14 through the potentiometer 35 through the resistor 33 and the resistor 29 to discharge the capacitor. After a time interval which is determined by the setting of the potentiometer 35, the base emitter junction of the transistor 31 will again be forward biased rendering the transistor 31 again conductive. The conduction in the transistor 31 will be amplified in the transistors 37 and 45 causing the transistor 13 to saturate so that the armature 11 is again energized from the automotive power supply. When the transistor 37 is rendered conductive, the collector of the transistor 37 again drops to near ground potential so that the transistor 53 and the transistor 57 are again cut off. Thus, at the end of a dwell period set by the potentiometer 35, the transistor 13 is rendered conductive and the transistor 57 is simultaneously rendered non-conductive. As a result, at the end of the dwell period, the armature of the motor 11 is energized but no current from the power source is applied through the braking shunt for the motor 11.

With the circuit of FIG. 3, it is possible for the two transistors 57 and 13 not to switch absolutely simultaneously and for an instant the transistor 57 may still be conducting after the transistor 13 begins to conduct. The resistor 59 serves to prevent a short in the form of the conducting transistors 13 and 57 from being across the power supply even for a very short instant.

Because the transistors 57 and 13 do respond to the same event, namely the conductivity or non-conductivity of the transistor 37, the instant that both of the transistors 13 and 57 conduct will be extremely short if it occurs at all and as a result, the resistor 59 may be made very small to insure stopping of the windshield wiper system in a small $\theta$ region and thus enable the wiper blades to be precisely positioned adjacent the molding at the end of each wiping cycle.

The resistor 29 serves to limit the amount of base current that flows into the transistor 31 when the pole of the switch 17 connects to the positive voltage applied to terminal 25. It also prevents the entire capacitor voltage from reverse biasing the emitter base string of the transistors 31, 37 and 45 when the pole of the switch 17 engages ground and thus reduces the reverse bias which the emitter base string must be able to withstand.

The length of the dwell period provided by the system of FIG. 3 is determined by the setting of the potentiometer 35 as pointed out above. As the movable arm of the potentiometer 35 is moved upward in a direction to reduce the amount of resistance provided by the potentiometer in the circuit, the charge on the capacitor 27 will change more rapidly during the dwell period and thus reduce the dwell period. The system of FIG. 3 has a unique feature in that the dwell period can be reduced to a point where it becomes truly zero, that is, the system operates continuously without the slightest hesitation at the end of each dwell period. This is made possible in the system of FIG. 3 because the resistance 33 is selected to be smaller than the resistance 29. As a result, if the contact of the potentiometer 35 is positioned near its upper end, the emitter base junction of the transistor 31 will not become reverse biased even for an instant when the pole of the switch 17 connects to ground. As explained above, when the pole of the switch 17 engages ground, the side of the capacitor 27 connected to the transistor 31 will jump to a minus value about equal to the power supply voltage. Accordingly, the voltage drop across the resistors 29 and 33 and the potentiometer 35 will be equal to about twice the power supply voltage. If the contact of the potentiometer is positioned near its upper end so that the resistance provided thereby plus the resistance of the resistor 33 is less than the resistance of the resistor 29, the base potential at the base of the transistor 31 will remain positive when the switch 17 connects to ground. For this reason, the base emitter junction will remain forward biased and the dwell period will be adjusted to true zero.

In the system of FIG. 3, the transistors 31, 37 and 45 function as amplifiers providing high gain and allowing the use of a small capacitor in the timing circuit and also ensuring that the switching transistor 13 becomes fully saturated at the end of a dwell period and becomes fully cut off at the beginning of a dwell period.

The embodiment of FIG. 4 is similar to that of FIG. 3 except that a three-brush DC permanent field motor 61 is used instead of a conventional two-brush motor. The three brushes of the motor 61 are designated by references numbers 65, 67 and 69. The brush 65 is connected to ground. When the motor 61 is energized between the brushes 65 and 67, it will be energized across its entire armature and the motor will have a relatively high torque, low speed characteristic. When the same energizing voltage is applied between the brushes 65 and 69, the motor 61 will run at a higher speed but will generate less torque due to the fact that the energizing voltage is applied across fewer turns of the armature. For this reason, the brush 67 is referred to as the low speed brush and the brush 69 is referred to as the high speed brush. The circuit of FIG. 4 is the same as FIG. 3 except that the collector of the transistor 13 is connected to the high speed brush 69, the resistor 59 has been eliminated, and the shunting circuit consisting of the transistor 57 is connected directly from the low speed brush 67 to ground with the emitter of the transistor 57 being connected to the brush 67 and the collector of the transistor 57 being connected to ground. In operation, when the transistor 13 is conducting, the motor will be energized between the high speed brush 69 and the brush 65 and the motor 61 will drive the wiper blades at a high speed as is desirable to more closely simulate an eye blink. When the windshield wiper blades enter the $\theta$ region and the pole of the switch 17 engages ground, the transistor 57 will be rendered conductive and simultaneously the transistor 13 will be rendered non-conductive in the same manner as described with respect to FIG. 3. Thus, the transistor 57 will close the shunt across the brushes 65 and 67 to brake the motor to a stop. A greater braking force will be produced in the motor than would be produced if the shunt were connected between the brushes 69 and 65 because of the higher torque and greater back EMF associated with the low speed brush 67. In addition, the need for the resistor 59 is eliminated due to the fact that the energizing circuit and the braking circuit are connected to different brushes. The armature resistance between the brushes 67 and 69 would limit any short circuit current which might flow during an instant when both the transistors 57 and 13 were conducting.

FIG. 5 illustrates another embodiment of the invention in which an electronic transistor switch is used to sense whether or not the motor is rotating and thus open the braking circuit across the motor whenever the motor is not rotating. As shown in FIG. 5, the system employs three-brush permanent magnet DC motor 61 just like the motor in the system of FIG. 4 to drive the windshield wipers 21. As in the case of FIG. 4, the three brushes of the motor 61 are designated by the reference numbers 65 and 67 and 69 with the brush 67 being the low speed and the brush 69 being the high speed brush. As in the case of the system of FIG. 4, the brush 65 is connected to ground and the collector of a PNP switching transistor 13 is connected to the high speed brush 69. The emitter of the transistor 13 is connected to the positive side of the automotive power supply applied at terminal 14.

The low speed brush 67 is connected through a resistor 71 to the emitter of a PNP transistor 73, the base of which is connected through a resistor 75 to the brush 69. The collector of the transistor 73 is connected to the pole of the position responsive switch 17, which in the $\theta$ region connects directly to ground and which when out of the $\theta$ region, connects through a resistor 77 to the positive side of the automotive power supply applied at a terminal 79.

The pole of the switch 17 is connected through a resistor 81 to one side of a timing capacitor 83, the other side of which is connected directly to the base of an NPN transistor 85. The junction between the capacitor 83 and the base of the transistor 85 is connected through a resistor 87 to one side of a potentiometer 89. The movable contact of the potentiometer 89 is connected directly to the positive side of the automotive power supply applied at terminal 14. The emitter of the transistor 85 is connected to the base of an NPN transistor 91, the emitter of which is connected to ground. The collectors of the transistors 85 and 91 are connected together through a resistor 93 to the base of the transistor 13.

When the motor 11 is driving the wiper blades through a wiping cycle, the transistor 85, 91 and 13 will be conducting so as to energize the motor 11 between the high speed brush 69 and the brush 65. Under such conditions, the brush 67 will be positive with respect to the brush 69 due to the back EMF generated by the motor 61. As a result, the emitter of the transistor 73 will be more positive than the collector of the transistor 73 and moreover, the base of the transistor 73 will be negative with respect to the emitter of the transistor 73 so that the transistor 73 will conduct. However, very little current will flow out of the high speed brush 67 due to the limiting effect of the resistors 77 and 71 so that negligble braking of the motor will occur as a result of this conduction and the high speed of the operation of the motor during the wiping operation will not be impaired. During this wiping cycle, the side of the capacitor 83 connected to the switch 17 will be charged to the plus voltage applied to terminal 79 and the other side of the capacitor 83 connected to the base of the transistor 85 will be discharged to near ground potential. When the windshield wiper system enters the $\theta$ region and the pole of the switch 17 engages ground, the potential on the side of the capacitor 83 connected to switch 17 will drop and thus cause a corresponding drop to a negative voltage on the side of the capacitor connected to the base of the transistor 85. Accordingly, the base emitter string of the transistors 85 and 91 will be back biased and these transistors and the transistor 13 will be cut off. At the same time, the transistor 73 will now have its collector connected to ground and its emitter connected to the positive voltage generated by the full back EMF of the motor 61 at brush 67. The base of the transistor 73 will be maintained negative with respect to the emitter by the back EMF generated between the brushes 67 and 69 and accordingly the transistor 73 will be fully conducting. As a result, full braking current will flow through the resistor 71 to quickly brake the motor 61 to a stop. As soon as the motor 61 stops rotating, the brush 69 will no longer be negative with respect to the brush 67 and accordingly the transistor 73 will be cut off. Thus, the motor is braked to a stop in the $\theta$ region whereupon the transistor 73 is rendered non-conductive in response to the motor armature ceasing rotation.

As soon as the pole of the switch 17 engages ground, the charge on the capacitor 83 will begin to change with the potential on the side of the capacitor 83 connected to the transistor 85 changing from its minus value toward the positive voltage applied at terminal 74. As soon as the potential on the side of the capacitor 83 connected to the base 85 rises above ground potential, the transistors 85 and 91 will be rendered conductive, which in turn will render the transistor 13 conductive and power will be applied to the motor 61 between the high speed brush 69 and the brush 65. When this power is applied, the transistor 73 will remain non-conductive until the motor is turning sufficiently fast for the back EMF between the brushes 67 and 69 to turn the transistor 73 on. By this time, the system will no longer be in the $\theta$ region and the pole 17 will be disengaged from ground and will be connected to the positive voltage at terminal 79 through the resistor 77. As a result, no power is applied from the source through the braking circuit while the motor is being driven out of the θ region. Accordingly, the resistor 71 can be made sufficiently small to bring the motor to a stop in a small θ region and thus make possible the precise positioning of the windshield wipers next to the molding in each dwell period at the end of each wiping cycle.

Instead of using a resistor 77 to prevent substantial braking current from flowing in the braking circuit during a wiping cycle, a diode poled to permit current flow from the terminal 79 to the switch 17 could be used. Such a diode would prevent any current from flowing in the braking circuit while the system is not in the θ region.

The embodiment of FIG. 6 has the same circuit as that of FIG. 3 except that a capacitor 95 is connected between the resistor 51 and the transistor 37, a direct connection replaces the resistor 59, and a resistor 97 is connected between the transistor 53 and the transistor 57. The inclusion of the capacitor 95 makes it possible to eliminate any need for the resistor 59. The resistor 97 serves to limit the emitter current of the transistor 57 and to lessen the power dissipated in the transistor 53.

When the motor 11 is running, driving the wiper blades through a wiping cycle, the transistor 13 as well as the transistors 31, 37 and 45 will be conducting and the transistors 53 and 57 will be non-conducting. When the windshield blades enter the θ region and the pole of the position responsive switch 17 engages ground, the transistors 31, 37, 45 and 13 will be cut off in the manner described with respect to FIG. 3. The cutting off of the transistor 37 will cause the potential at the collector of the transistor 37 to rise and this rise in potential will be transmitted by the capacitor 95 to the base of the transistor 53 rendering the transistors 53 and 57 conductive. The conduction of the transistor 57 applies electrodynamic braking to the motor 11 bringing it to a stop. As soon as the voltage at the collector of the transistor 37 rises, the capacitor 95 will begin to charge and as a result, the potential at the base of the transistor 53 will begin to drop toward ground. As soon as the capacitor 95 is charged sufficiently, the transistor 53 and accordingly the transistor 57 will be cut off.

The capacitor 95 functions as a differentiator operating on the voltage step function which is generated at the collector of the transistor 37. At the end of the dwell period when the transistor 37 turns on, a negative going voltage step function will be produced at the collector of the transistor 37. If the capacitor 95 has not charged sufficiently at the end of the dwell period to turn the transistors 53 and 57 off, the negative going step function produced at the collector of the transistor 37 will cause the transistors 53 and 57 to turn off. Because of the differentiating action of the capacitor 95, the transistors 53 and 57 will be driven off more quickly in the negative going step function than the transistors 45 and 13 will turn on in response to the conduction of the transistor 37. Accordingly there is no danger of power being applied from the transistor 13 through the braking circuit and for this reason, there is no need for a resistor in the braking circuit.

The circuit of FIG. 4 could also be modified by providing a capacitor between the resistor 51 and the transistor 37 in which case an operation similar to that of FIG. 6 would be achieved.

The above description is of preferred embodiments of the invention and many modifications may be made thereto without departing from the scope of the invention which is defined in the appended claims.

What is claimed is:

1. In an intermittent windshield wiper system having an electric motor for driving windshield wipers through repeating wiping cycles and circuit means for energizing said motor to drive said wiper blades through repeating wiping cycles stopping said wiper blades for dwell periods at the ends of such successive wiping cycles, the improvement wherein said circuit means includes braking means to electrodynamically brake said motor to a stop at the ends of such successive wiping cycles, said braking means including a current path connected across the armature of said motor and switch means to open said current path automatically whenever said motor is not rotating.

2. In a system as defined in claim 1 wherein said switch means comprises an electronic valve.

3. In a system as recited in claim 1 wherein said motor has first, second and third brushes and wherein said circuit means energizes said motor between said second and third brushes to cause said motor to drive said wiper blades through each wiping cycle and wherein said current path is connected between said first and third brushes.

4. In a windshield wiper system as recited in claim 3 wherein said switch means comprises an electronic valve responsive to the potential between said second and third brushes to open said current path whenever said motor is not rotating.

5. In an intermittent windshield wiper system as recited in claim 4 wherein said electronic valve comprises a transistor having its emitter connected to said first brush and having its base connected to said second brush.

6. In an intermittent windshield wiper system having an electric motor for driving windshield wipers through a repeating wiping cycle and circuit means for energizing said motor to drive said wipers intermittently stopping said wipers for dwell periods at the ends of successive wiping cycles, the improvement wherein said circuit means includes braking means to brake said motor to a stop at the ends of such successive wiping cycles and wherein said circuit means includes means to disable said braking means from braking said motor whenever said motor is not rotating.

7. In a motor system for driving an output intermittently having an electric motor for driving said output and circuit means for energizing said motor to drive said output in steps stopping for a dwell period at the end of each step, the improvement wherein said circuit means includes braking means to electrodynamically brake said motor to a stop at the end of each step, said braking means including a current path connected across the armature of said motor and switch means to open said current path automatically whenever said motor is not rotating.

8. In a motor system defined in claim 7 wherein said switch means comprises an electronic valve.

9. In a motor system as recited in claim 7 wherein said motor has first, second and third brushes and wherein said circuit means energizes said motor between said second and third brushes to cause said motor to drive said output through each step and wherein said current path is connected between said first and third brushes.

10. In a motor system as recited in claim 9 wherein said switch means comprises an electronic valve responsive to the potential between said second and third brushes to open said current path whenever said motor is not rotating.

11. In a motor system as recited in claim 10 wherein said electronic valve comprises a transistor having its emitter connected to said first brush and having its base connected to said second brush.

12. In a motor system for driving an output intermittently having an electric motor for driving said output and circuit means for energizing said motor to drive said output in steps, stopping said output for a dwell period at the end of each step, the improvement wherein said circuit means includes braking means to brake said motor to a stop at the end of each step, and said circuit means further including means to disable said braking means from braking said motor whenever said motor is not rotating.

13. A motor system for providing an intermittent drive, comprising a motor having a pair of armature terminals, means for connecting one of said terminals to ground, means for connecting the other one of said terminals to a source of voltage relative to ground to energize said motor, motor responsive control circuit means for intermittently disconnecting said other terminal from said voltage source for regular dwell periods initiated in response to a predetermined rotational position of said motor, separate means for connecting said other terminal to ground to brake said motor in response to said predetermined position of said motor, and separate motion responsive means for disconnecting said other terminal from ground as soon as said motor stops so that said other terminal does not remain connected to ground at the end of a dwell period.

* * * * *